UNITED STATES PATENT OFFICE.

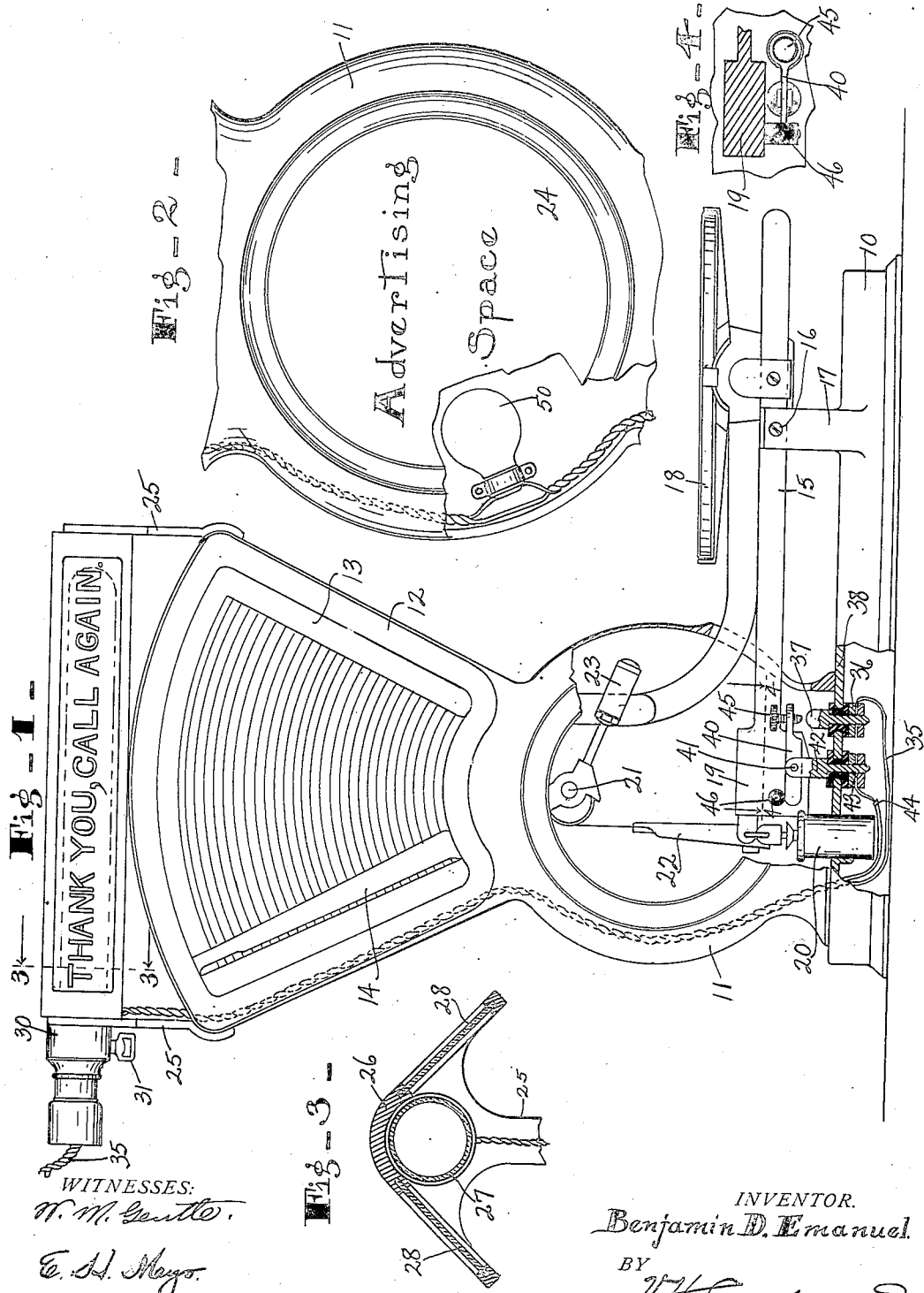

BENJAMIN D. EMANUEL, OF ANDERSON, INDIANA.

WEIGHING-SCALE.

1,030,879. Specification of Letters Patent. Patented July 2, 1912.

Application filed May 8, 1911. Serial No. 625,890.

*To all whom it may concern:*

Be it known that I, BENJAMIN D. EMANUEL, of Anderson, county of Madison, and State of Indiana, have invented a certain useful Weighing-Scale; and I do hereby declare that the following is a full, clear, and exact description thereof, reference being had to the accompanying drawings.

The object of this invention is to provide means associated with weighing or computing scales for lighting the indicating means, or the chart, on each side of the machine, if necessary, or for lighting any other part of the machine as desired. The lighting is controlled by the weighing beam, the current being turned on before the scale begins to weigh and remaining on during the operation of the scale as a weighing or computing scale, and the current is turned off as the device ceases to operate as a weighing or computing scale. In other words, the switch is not controlled, affected or actuated during the operation of the scale in weighing, but it is opened at the first slight movement of the scale beam and closed at the extreme end of its movement when returning to normal position, so that while the weighing process takes place the switch is not in engagement with any moving part of the scale, and the scale operates, therefore, entirely independently of the lighting or current control.

The invention is arranged so as to be adaptable for various scales, whether fan-shaped, barrel or drum scales.

The nature of the invention will be understood from the accompanying drawings and the following description and claims.

In the drawings Figure 1 is a side elevation of the scale with a portion of the lower part broken away and in vertical section. Fig. 2 is a side elevation of the middle part of the housing and the upper portion broken away. Fig. 3 is a section on the line 3—3 of Fig. 1. Fig. 4 is a section on the line 4—4 of Fig. 1.

In the drawings, the housing of the scale has a base 10, an inner circular portion 11, and an upper portion 12. The latter contains the chart 13 and the movable indicator 14, which may be provided with suitable graduations and indications as is common in such scales.

15 is a scale beam fulcrumed at 16 on a stand 17 and on its outer portion carrying the load platform 18, so that when the load is applied, the inner end 19 will be elevated. The inner end 19 is enlarged and is connected with a dash-pot 20 and also with the indicator shaft 21 by the connection 22.

23 is the pendulum weight connected with the indicator shaft which moves downward as the load is applied.

The indicating means is preferably double, that is, the same being shown on opposite sides of the upper part of the scale, and the intermediate housing 11 is annular and provided with glass sides 24. The foregoing may be said to constitute the scale proper and is of a common type, although the invention may be applied to other similar types of scales.

On the upper part of the housing 12 a frame is secured which consists of vertical bars 25 secured to the housing and carrying the ends of an A-shaped frame 26 which extends longitudinally of the housing and chart and over the same, with the wings extending at downward inclinations to each side of the chart to form reflectors for reflecting light from the lamp 27 between them upon the chart in the opposite sides of the scale. The reflectors may be as here shown, namely, the wings consisting of a metal frame into which enameled glass 28 is adapted to be slipped and which will serve both as a reflector and for containing a sign, any sign that may be desired. These strips of glass are interchangeable so that they may be readily slipped out or replaced. The lamp 27 is an incandescent lamp removably secured in the socket 30 which is removably mounted in the left-hand support 25 and has a switch 31.

The current comes in through the line 35 from any source of supply, such as a lamp fixture in a store, and over one of the wires, and passes through the socket 30 and down through the housing to the base of the scale to the bonding post 36 and the terminal 37, which are secured to the plate 38 of the frame of the scale but are insulated therefrom. The switch 40 is fulcrumed at 41 in the bar 42 which forms a part of the binding post 43 to which the return wire 44 is connected. The parts 42 and 43 are secured to the plate 38 and insulated therefrom. The switch lever is moved to the closing position by gravity as the end of it carrying a contact screw 45 is heavier than the other end. When the contact screw 45 comes into contact with the terminal 37 the switch will be closed and the lamp operated, as the wire 44 returns through the housing to the lamp 27. The switch is opened by a roller or like projection 46 covered with insulating material and secured to the rear end of the scale beam 15. If the switch 40 does not positively actuate, it may be drawn down by increasing its weight.

As soon as any weight at all is applied to the platform 18, the rear end of the scale beam is somewhat elevated before the weighing operation practically begins. As soon as that occurs, the switch will be closed and the lights turned on. The remainder of the operation is independent of the switch and lighting apparatus, as the switch, during such operation, is not affected by the scale beam or any other moving part of the scale. After the weighing operation is completed and the load removed from the platform 18 the scale beam 15 returns to its normal position and opens the switch.

I have also shown a lamp 50 in the middle part of the housing, which is in connection with the line 44 so as to light that part, and the side glass plates 24 may have advertising matter thereon so that the same will appear and such light will expose to view and direct the operation of the central part of the scale as fully or more fully than in the day time.

I claim as my invention:

1. The combination with a weighing scale having a housing, indicating means and a movable part, of an A-shaped frame extending longitudinally of the housing and above the same and with inclined side portions projecting to both sides of the indicating means, arms secured to the housing for mounting said frame so that the lateral portions of said frame will serve as reflectors for directing the light to both sides of the indicating means, an electric lamp extending longitudinally over and within said frame, an electric conductor for the lamp which extends through the housing, and a switch for controlling the current through said conductor which switch is controlled by the movable part of the scale.

2. The combination with a weighing scale having a housing, indicating means and a movable part, an A-shaped frame above and extending longitudinally of the housing with the lateral portions thereof formed as guides, reflecting glass plates insertible in said guides, arms secured to the housing for supporting said frame so that the lateral portions of said frame will serve as reflectors for directing the light to the indicating means, an electric lamp extending longitudinally over and within said frame, an electric conductor for the lamp which extends through the housing, and a switch for controlling the current through said conductor which switch is controlled by the movable part of the scale.

In witness whereof, I have hereunto affixed my signature in the presence of the witnesses herein named.

BENJAMIN D. EMANUEL.

Witnesses:
J. D. HOPPER,
LUELLA COSTELLO.